United States Patent

Brandenstein et al.

[11] 4,437,556
[45] Mar. 20, 1984

[54] THROW-OUT BEARING FOR CLUTCHES, ESPECIALLY FOR MOTOR VEHICLES

[75] Inventors: Manfred Brandenstein, Eussenheim; Leo Müller, Essleben, both of Fed. Rep. of Germany

[73] Assignee: SKF Kugellagerfabriken GmbH, Schweinfurt, Fed. Rep. of Germany

[21] Appl. No.: 264,337

[22] Filed: May 18, 1981

[30] Foreign Application Priority Data

May 24, 1980 [DE] Fed. Rep. of Germany ....... 8014056

[51] Int. Cl.³ .............................................. F16D 23/14
[52] U.S. Cl. ................................. 192/98; 192/30 V; 192/110 B; 308/233
[58] Field of Search .................. 192/98, 30 V, 110 B; 308/233, 187.1; 277/207 A, 209; 15/102, 256.3

[56] References Cited

U.S. PATENT DOCUMENTS

| | | | |
|---|---|---|---|
| 2,396,491 | 3/1946 | Chamberlain | 277/207 A |
| 2,615,741 | 10/1952 | Nathan | 277/207 A |
| 2,929,088 | 8/1953 | Weir | 15/102 |
| 3,631,954 | 1/1972 | Coaley | 192/98 |
| 3,840,933 | 10/1974 | Schwab et al. | 15/256.53 |
| 3,904,008 | 9/1975 | Sonnerat | 192/98 |
| 4,013,327 | 3/1977 | Kunkel et al. | 192/98 X |
| 4,080,019 | 3/1978 | Flaissier et al. | 192/98 X |
| 4,268,041 | 5/1981 | Sovish et al. | 277/208 X |

FOREIGN PATENT DOCUMENTS

| | | | |
|---|---|---|---|
| 278092 | 1/1952 | Switzerland | 277/209 |
| 2016629 | 9/1979 | United Kingdom | 277/207 A |

Primary Examiner—Rodney H. Bonck
Assistant Examiner—James J. Merek
Attorney, Agent, or Firm—Daniel M. Rosen

[57] ABSTRACT

In a throw-out bearing for a clutch, a movable element, which may be comprised of a sliding sleeve, is slidably supported on a guide element by flexible conical projections extending inwardly from the movable part to the guide element. The projections may be on the end of and the unitary part of the sliding sleeve, or they may be a part of a sleeve inserted within the sliding sleeve, or they may form a part of the fixed ring of the bearing.

15 Claims, 4 Drawing Figures

THROW-OUT BEARING FOR CLUTCHES, ESPECIALLY FOR MOTOR VEHICLES

This invention relates to a throw-out bearing for clutches, especially for motor vehicles, comprised of a clutch or drive housing, and a guiding element affixed to one of said housings. Such arrangements are further provided with a movable part arranged to be axially movable along the fixed guiding element. The bore of the movable part is greater than the outer diameter of the fixed guide element by an amount greater than the customary guide play, and the movable element is supported on the guide element by means of a flexible element. The flexibility of the flexible element is essentially greater than that of other sections or component parts of the movable element.

A throw-out bearing of this type is disclosed, for example, in Coaley, U.S. Pat. No. 3,631,954, corresponding to German reference number DE-PS No. 1929184. In a given example of this known bearing, the elastic means are strip shaped or annular, the latter preferably having an annular cross-section, and are formed and laid in an annular groove in the bore of the movable part. This arrangement requires, on the one hand, many parts and additional production steps, especially for the formation of the annular groove, and on the other side, also a difficulty of assembly. Due to the circular cross-section of the rings, these rings form a narrowing wedge-shaped gap with the outer surface of the guide element. Material rubbed off the guide element is drawn to the moving part of the gap and forms a ramp. The guide element, during axial movement, ascends the ramp to act as a clamping wedge, and thereby can block the axial movement of the moving part in some cases.

The object of the present invention is to improve a throw-out bearing of the above type, so that unhindered axial movement and radial movement for the compensation of the centering position with respect to the clutch plate spring is insured. In addition, the number of parts and the operations for fabricating the throw-out bearing are reduced.

As a result of this structure for the moving part, on the one hand the moving part is resiliently supported on the guide element, and on the other hand radial and axial movement are permitted. The support of the movable part by means of the elastic or resilient projections permits radial displacement of the movable part, and thereby permits radial displacement of the bearing affixed thereto with respect to the guide element, so that the bearing can be positioned without great reactive force to be sufficiently centered with respect to the tongues of the clutch plate spring. The radial movability can be made relatively large by providing a corresponding play between the bore of the movable part and the outer surface of the guide element. On the other hand the conical projections on the movable part act as slides which, if the case arises, rub off dirt lying on the guide element, during axial movement of the movable part, and limit penetration of the dirt into the movable part, thereby avoiding jamming of the movable part.

In accordance with a further feature of the invention the projections can be formed to be unitary with the movable part. In this arrangement the sliding sleeve of the movable part may be coupled to the inner ring of the throw-out bearing, when the outer ring of the bearing is the rotating bearing. Alternatively, such bearings may have rotating inner rings, with the sliding sleeve coupled to the fixed outer ring, or the sliding sleeve may have a thin-walled shell inserted therein. In this manner the number of parts of the clutch throw-out bearing is reduced, and the assembly thereof is also substantially facilitated.

In accordance with a further feature of the invention the sliding sleeve, or the thin-walled shell or sleeve inserted therein, if such is provided, may be of an elastic vibration and noise isolating material. Such a sliding sleeve, or a sleeve inserted therein, may be prepared in a simple manner with the projections being formed thereon in one piece by, for example, casting or injection molding, without requiring additional processing steps. Due to the characteristics of the materials employed, such an arrangement not only serves for the self-centering of the bearing, but also provides noise and vibration damping.

The projections, in accordance with a further feature of the invention, may have cross-sections of diminishing thickness toward the free ends thereof, and/or the projections may be provided with circumferentially distributed axially extending slits.

In order that the invention will be more clearly understood, it will now be disclosed in greater detail with reference to the accompanying drawings, wherein.

Figure 1:
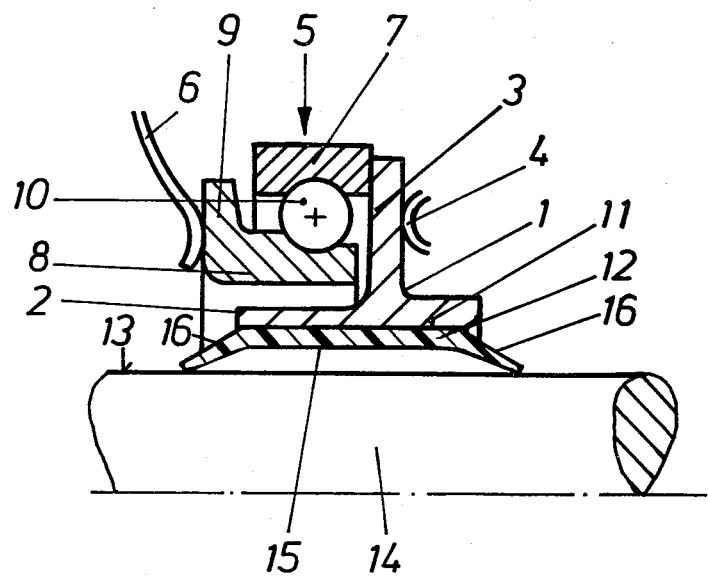
FIG. 1 is a longitudinal cross-sectional view of a clutch throw-out bearing in accordance with the invention, on one side of a guide element, wherein the throw-out bearing has a sliding sleeve and a sleeve of elastic material inserted in the bore thereof.

Referring now to the drawings, and more in particular to FIG. 1, therein is illustrated a sliding sleeve 1 having a cylindrical section 2 and a radially extending flange 3. The operating lever 4 (only symbolically shown) engages a flange 3 for operation of the clutch. The throw-out bearing 5 is operatively coupled to the spring fingers of the clutch plate spring 6 (only partly shown). The throw-out bearing 5 is comprised of an outer ring 7 which is affixed to the flange 3 of the sliding sleeve 1 in a conventional manner (not illustrated). The throw-out bearing also has an inner ring 8 with a running ring 9 unitarily formed thereon, the running ring 9 being postioned to engage the spring fingers of the clutch plate spring 6. The bearing 5 also has balls 10 arranged between the bearing rings 7 and 8. The sleeve 12 is of an elastic vibration and noise damping material and is arranged in the bore 11 of the cylindrical section 2 of the sliding sleeve 1. This sleeve 12 has a cylindrical inner section 15 with a diameter larger than the diameter of the guide element 14. The guide element 14 may be affixed, in known manner, to a clutch housing or drive housing (not shown), and is preferably a shaft of circular cross-section. A conical radially inwardly directed annular projection 16 is provided on each end of the inner section 15. The sleeve 12, and thereby also the sliding sleeve 1, are elastically supported on the guide element 14 by means of these projections 16. In the event of eccentric positioning of the throw-out bearing 5 with respect to the fingers of the clutch plate spring 6, the bearing 5 can give in the radial direction with the sliding sleeve, by means of the resilient projections 16, until a center position of the bearing 5 with respect to the fingers of the clutch plate spring 6 is attained. The edges of the projections 16 scrape off dirt particles lying on the outer surface 13 of the guide element 14 upon axial movement of the sliding sleeve and the sleeve 12 set therein with respect to the guide element 14.

Figure 2:
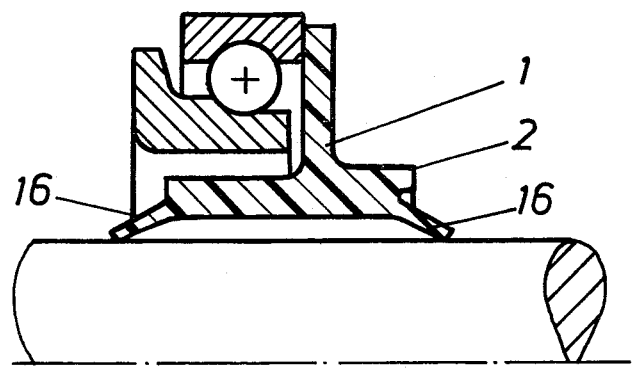
FIG. 2 is a cross-sectional view of a modification of the throw-out bearing of FIG. 1, wherein the sliding sleeve is directly supported on the guide element.
Figure 3:
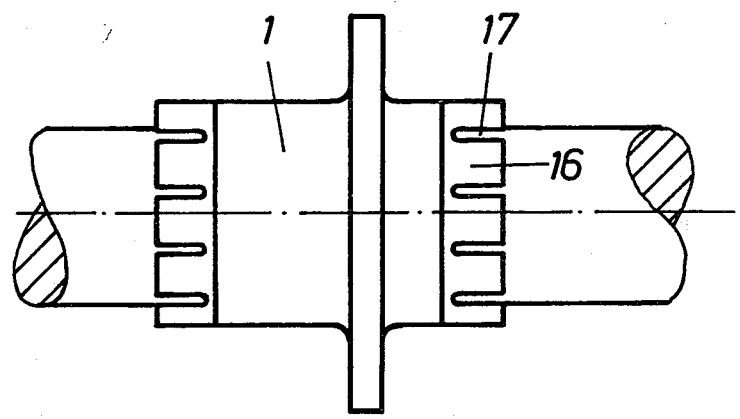
FIG. 3 is a plan view of the sliding sleeve and the guide element of FIG. 2.

In the embodiment of the invention illustrated in FIGS. 2 and 3, the sliding sleeve itself is of an elastic vibration and noise isolating material, and has a conical radially inwardly directed annular projection 16 on each end of the cylindrical guide section 2.

As is more clearly seen in FIG. 3, the annular projections 16, which diminish in cross-section toward the free end thereof, are provided with circumferentially distributed axially extending slits 17. The slits 17 impart elasticity to the projections 16, and thereby in any event inhibit the sliding sleeve 1 from being affixed to the guide element 14.

Figure 4:
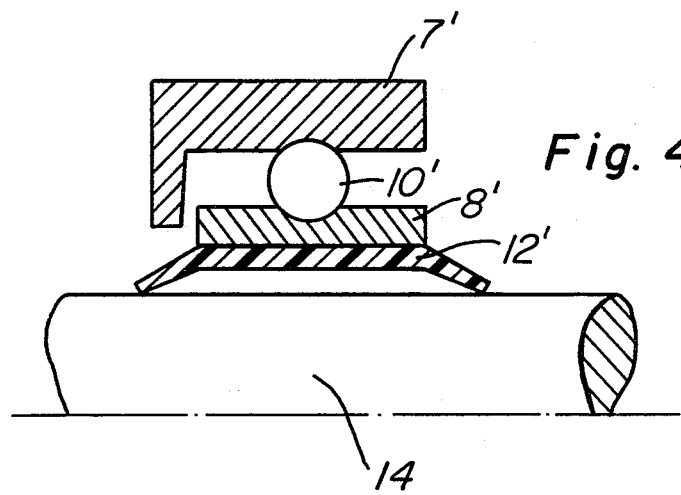
FIG. 4 is a cross-sectional view of another modification of the throw-out bearing of FIG. 1.

FIG. 4 illustrates a modified throw-out bearing wherein the bearing has an outer ring 7' separated from an inner ring 8' by balls 10', the resilient sleeve 12' being connected to the inner ring 8'.

The invention is not limited to the above-described arrangements. Thus, it is possible to omit the sliding sleeve itself, and to couple the projections which engage the guiding element 14 directly to the non-rotating bearing ring. It is therefore intended in the following claims to cover each such variation and modification as follows within the true spirit and scope of the invention.

What is claimed is:

1. In a throw-out bearing for clutches comprised of a guide element held to a clutch or drive housing, a movable part having a bore within which the guide element extends, the bore having a diameter greater than that of the guide element, the movable part being supported on the guide element by flexible means, the improvement wherein said flexible means comprises conical annular projection means extending from at least one end of said movable part radially inwardly to the guide element for supporting said movable part on the guide element, said projection means being shaped to wipe said guide element on relative axial movement between the movable part and guide element.

2. The throw-out bearing of claim 1 wherein the projections are formed as a part of the movable part.

3. The throw-out bearing of claim 2 wherein the movable part comprises a sliding sleeve, and the projections are formed as a part of the sliding sleeve.

4. The throw-out bearing of claim 3 wherein the sliding sleeve is of an elastic vibration and noise damping material.

5. The throw-out bearing of claim 1 wherein said movable part comprises a sliding sleeve, and further comprising a sleeve element inserted within said sliding sleeve, said projections being arranged on said sleeve element.

6. The throw-out bearing of claim 5 wherein said sleeve element is of an elastic material, and said projections are formed as a unitary element therewith.

7. The throw-out bearing of claim 2 wherein said movable element comprises a bearing having a rotating outer ring and a fixed inner ring, said projections being formed as a unitary element with said inner ring.

8. The throw-out bearing of claim 1 wherein the projections have diminishing cross-sectional thickness toward the free ends thereof.

9. The throw-out bearing of claim 1 wherein said projections have axially extending slits distributed about their circumference.

10. The throw-out bearing of claim 1 wherein said movable part comprises a sliding sleeve, and a bearing having an inner ring and an outer ring and balls disposed therebetween, one of said rings being connected to said sliding sleeve.

11. The throw-out bearing of claim 1 wherein said conical annular projection means on said at least one end of said movable part extends axially outwardly of said movable part from said one end.

12. The throw-out bearing of claim 1 wherein said conical projection means extend axially outwardly from both of the ends of said movable part.

13. The throw-out bearing of claim 1 wherein the radially inner end of said conical annular projection means is shaped to scrap said guide elements upon movement of said movable part in the direction in which said conical annular projection means extends.

14. The throw-out bearing of claim 12 wherein the radially inner ends of said conical annular projections are shaped to scrap said guide element upon relative movement of said movable part in the direction of the respective conical annular projection means.

15. The throw-out bearing of claim 1 wherein said conical annular projection means have conical radial inner and outer surfaces joined at the radial inner ends by an end surface, whereby the radial outer end of said conical annular projection means scraps said guide element upon relative movement of said guide element and movable part, in one direction.

* * * * *